(12) United States Patent
Page et al.

(10) Patent No.: US 7,085,140 B2
(45) Date of Patent: Aug. 1, 2006

(54) ELECTRONIC HOUSING ASSEMBLY AND METHOD

(75) Inventors: Kevin D. Page, West Palm Beach, FL (US); Douglas W. Moskowitz, Weston, FL (US)

(73) Assignee: Motorola, Inc., Schaumburg, IL (US)

( * ) Notice: Subject to any disclaimer, the term of this patent is extended or adjusted under 35 U.S.C. 154(b) by 253 days.

(21) Appl. No.: 10/679,548

(22) Filed: Oct. 6, 2003

(65) Prior Publication Data

US 2005/0073821 A1    Apr. 7, 2005

(51) Int. Cl.
*H05K 7/18* (2006.01)
(52) U.S. Cl. .................. 361/801; 343/702; 379/446
(58) Field of Classification Search ............ 361/801, 361/755, 752, 797, 800, 724; 379/446; 343/702
See application file for complete search history.

(56) References Cited

U.S. PATENT DOCUMENTS

| 5,138,329 | A | * | 8/1992 | Saarnimo et al. ........... 343/702 |
| 5,218,169 | A | * | 6/1993 | Riceman ....................... 174/67 |
| 5,467,097 | A | * | 11/1995 | Toko ........................... 343/702 |
| 6,064,341 | A | * | 5/2000 | Hassemer .................... 343/702 |
| 6,201,712 | B1 | * | 3/2001 | Barnett ....................... 361/814 |
| 6,546,102 | B1 | * | 4/2003 | Blackwell, Jr. et al. ..... 379/446 |

\* cited by examiner

*Primary Examiner*—Randy W. Gibson
*Assistant Examiner*—Ivan Carpio

(57) ABSTRACT

A housing assembly (100) and method (300) of assembly includes a housing (105) having one or more recessed areas (130) on at least a first side (120). Also included is a floor member (110) having one or more protrusions (135) and is pivotably mounted to one or more recessed areas on the first side using the protrusions. A tubular member (115) is included for engaging the floor member on a second side (125) of the housing where the engagement prevents the floor member from pivoting. The method of assembly includes engaging and pivotably mounting (310) a first portion of a floor member to a first side of a housing and pivoting (315) the floor member to an assembled position. The method further includes engaging (320) a second portion of the floor member by slidably introducing a tubular member through the housing and adjacent to a blocking structure of the floor member, thereby substantially preventing further pivoting of the floor member.

14 Claims, 3 Drawing Sheets

ELECTRONIC HOUSING ASSEMBLY AND METHOD

FIELD OF THE INVENTION

This invention relates in general to electronic devices, and more particularly, to the housing of an electronic device and the method of assembling the same.

BACKGROUND OF THE INVENTION

Electronic devices continue to evolve rapidly with the constant improvements in designs, features, materials, and components. The electronic devices of the past seem rudimentary to the advanced devices currently available. Nevertheless, electronic devices continue to improve in performance and in overall design. One common goal among electronic device designers concerns designs that are rugged while not proving too cumbersome for daily use. Thus, many designs have been introduced to reduce the size of electronic devices without sacrificing performance or durability. With a reduction in size, many electrical components have been shifted and re-arranged into a compact configuration that has required innovative designs.

Most electronic devices include a housing assembly that contains the electronic parts and components of the electronic device. While housing assemblies typically include an outer shell which functions to both hold the components of the device and to protect the components of the electronic device from external elements, other housing assemblies have multiple structures for supporting different components within the outer shell of the housing. For example, some housing assemblies with multiple support structures have been constructed from a mold that forms a frame for mounting the different components of the electronic device.

Designing housing assemblies to be constructed from a mold can present some advantages. For instance, housing assemblies that provide a unitary frame for mounting components and parts generally provide a rigid and non-flexible frame when constructed of the appropriate materials. In many instances, electronic device housings are preferably non-flexible. Further, integrated and continuous housing assemblies can have manufacturing advantages, such as a limited number of fabrication materials.

Nevertheless, integrated and continuous housing assemblies have inherent limitations. For example, integrated housing assemblies typically do not provide modular capabilities for expanding such devices. Further, maintenance work on devices having such housing assemblies can be burdensome, and in some cases, impossible. Thus, some designs have attempted to provide housing assemblies of multiple structures which can be fastened together to produce a complete housing assembly.

While such housing assemblies can advantageously use various materials with different properties for the different structures, the different structures must be rigidly fixed together, as loose structures and components are typically not desirable. Prior art designs have rigidly fixed the multiple structures of a housing assembly with a variety of mechanical and/or chemical attachments, such as screws, rivets, ultrasonic welding, heat seals, epoxy, glues, and the like. Such mechanical and/or chemical attachments can greatly increase the assembly time and can introduce yet another material into the housing assembly, thereby increasing overall assembly costs. Further, such mechanical and/or chemical attachments are commonly the location of stress and fatigue failures due to weakened structural components and/or faulty construction.

SUMMARY OF THE INVENTION

In one embodiment, the present invention provides a housing assembly that includes a housing having one or more recessed areas on at least a first side. The housing assembly can also include a floor member having one or more protrusions that can be pivotably mounted to the one or more recessed areas on the first side using the one or more protrusions. Also, a tubular member can be included for engaging the floor member on a second side of the housing where the engagement prevents the floor member from pivoting.

In another embodiment, the floor member can also include one or more integrated hook portions which engages the tubular member. The integrated hook portion can extend through an opening in a portion of the housing to engage the tubular member. The integrated hook portion can rotate through an opening in a rear portion of the housing before engagement with the tubular member. The tubular member can be an antenna tube fixed to the housing and the floor member can be made from an electrically conductive material. The housing assembly can be for a portable electronic product. The housing assembly can include a circuit board and the floor member can be grounded to the circuit board.

In another aspect of an embodiment in accordance with the invention, a handheld device can include a housing and one or more mounting structures on the housing. The device can also include one or more plate members, where the plate member pivotably mounted to the mounting structure and having one or more blocking structures. Further, the device can include one or more blocking members. The blocking members and the blocking structures can form a passive blocking configuration where the blocking members block the plate member from pivoting.

In one arrangement, the blocking member can be an elongated cylinder and can also be an antenna housing. The plate member can include a recess for holding an integrated circuit card. Further, the handheld device can include a circuit board where the plate member can be grounded to the circuit board in one or more locations along the plate member.

In another arrangement, the plate member can support a power supply. The plate member can also include one or more protrusions and the mounting structure can include one or more recessed areas corresponding to the protrusions. The blocking structure can also include one or more hook portions dimensioned to at least partially wrap around the blocking member.

In another aspect of the invention, a method of assembling a housing assembly can include the steps of engaging and pivotably mounting a first portion of a floor member to a first side of a housing and pivoting the floor member to an assembled position. The method can further include engaging a second portion of the floor member by slidably introducing a tubular member through the housing and adjacent to a blocking structure of the floor member, thereby substantially preventing further pivoting of the floor member. The engaging step can lock the floor member to the assembled position. The method can also include fixing the tubular member to the housing.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE DRAWINGS

Figure 1:
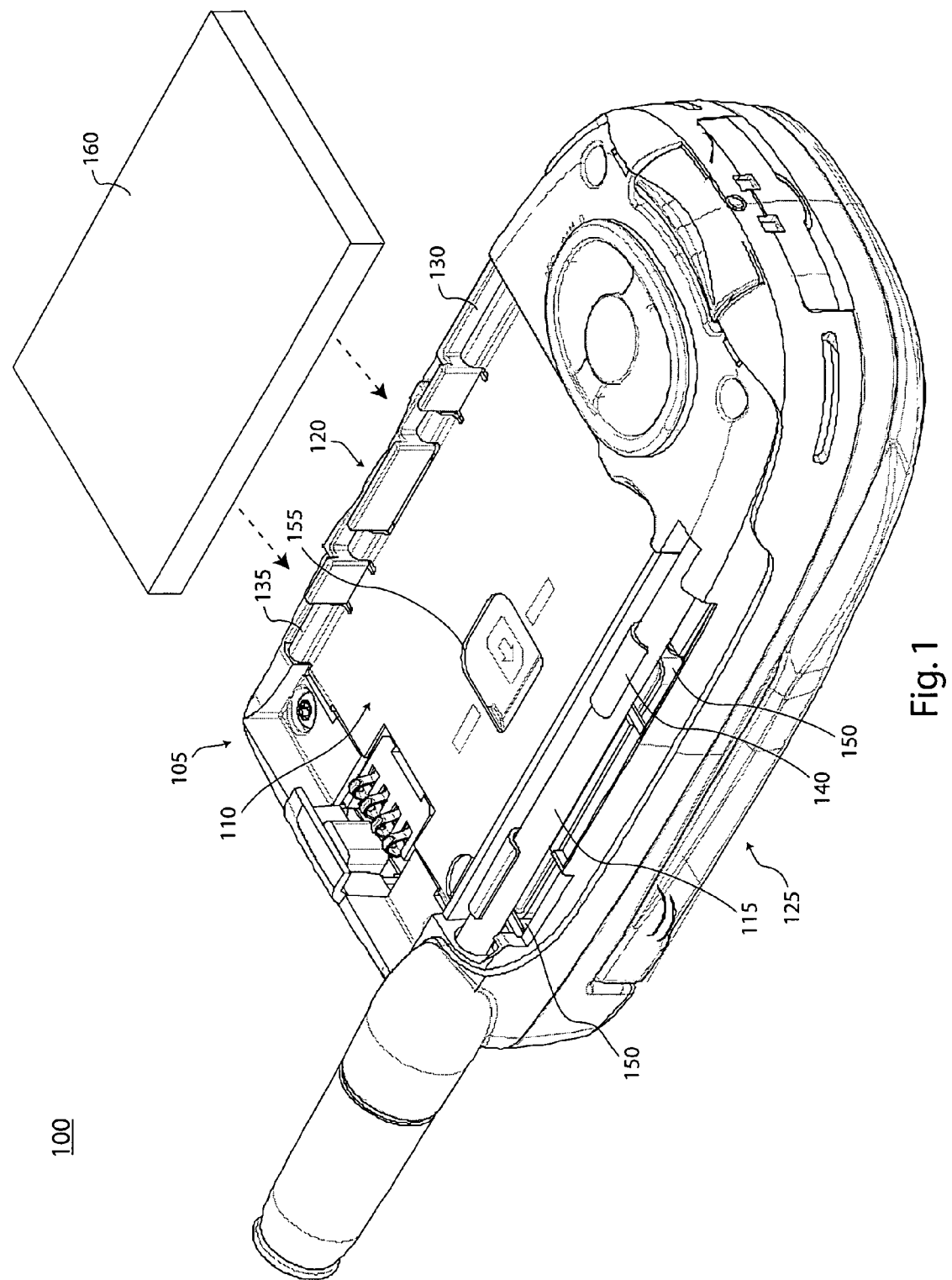
FIG. 1 illustrates one embodiment of a housing assembly of a device in a partially assembled configuration in accordance with the inventive arrangements.

While the specification concludes with claims defining the features of the invention that are regarded as novel and non-obvious, it is believed that the invention will be better understood from a consideration of the following description in conjunction with the drawing figures, in which like reference numerals are carried forward.

The invention provides a device having a housing assembly and a method of assembling the housing. The housing assembly includes a floor member that is secured to the housing without any mechanical means. Securing the floor member to the housing without any mechanical means can require less parts, remove stress concentrations, reduces assembly and manufacturing time, and consequently, can reduce overall costs.

Figure 2:
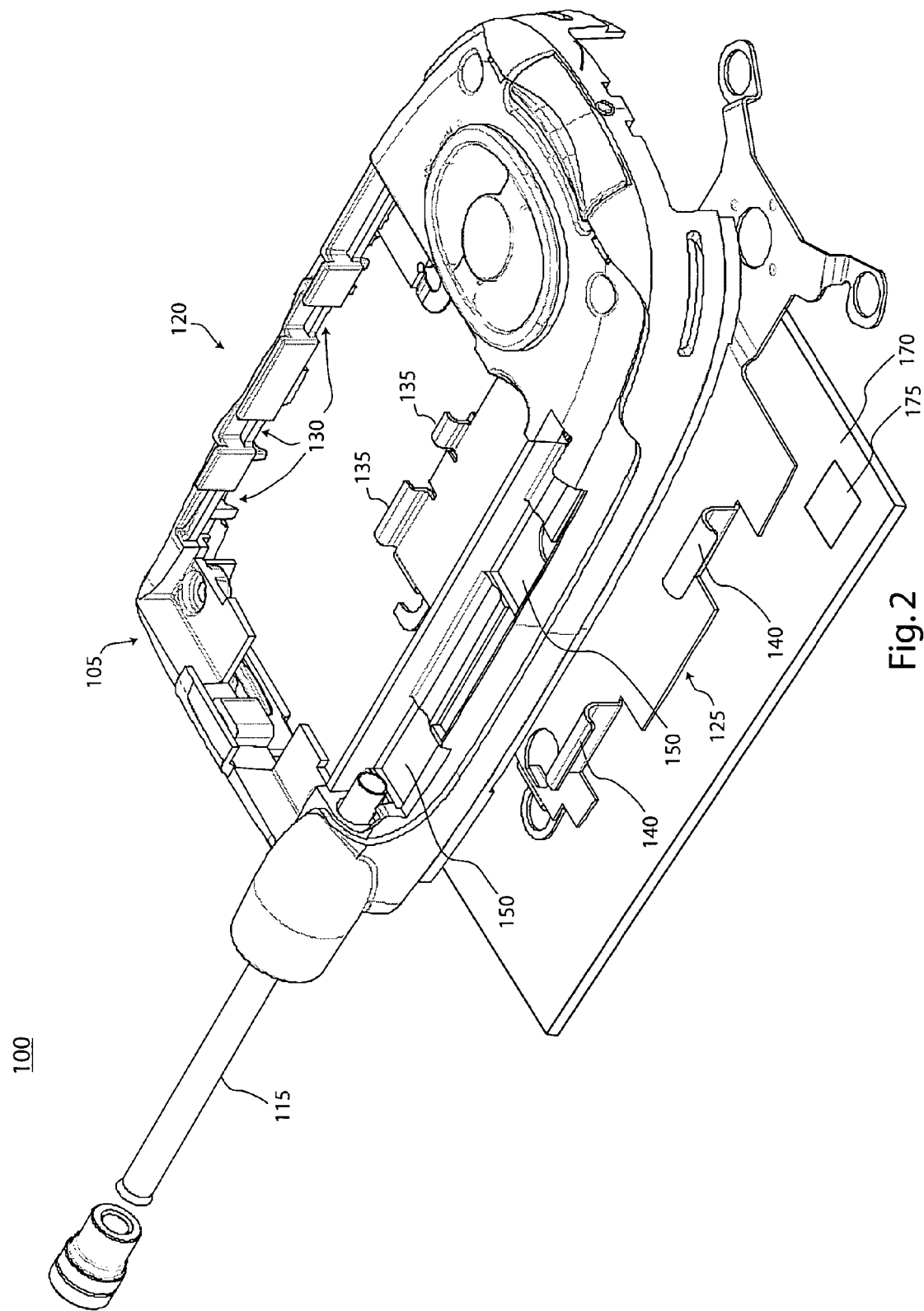
FIG. 2 illustrates the housing assembly of FIG. 1 in a dissembled configuration in accordance with the inventive arrangements.

One embodiment in accordance with the invention provides an housing assembly 100 as illustrated in the partially assembled housing shown in FIGS. 1 and 2. The housing assembly 100 can have a housing 105, a floor member (or a plate member) 10, a tubular member (or a blocking member) 115. A battery 160 and a circuit board 170 can also be provided. In the partially assembled configuration shown in FIG. 1, the floor member 110 can be retained in such configuration without the use of any mechanical and/or chemical attachments, such as screws, rivets, ultrasonic welding, heat seals, epoxy, glues, and the like. Further, even though the floor member 110 is retained without any mechanical and/or chemical attachments, the floor member 110 provides structural support and stiffness to the overall housing assembly 100.

Referring to FIG. 2, the housing 105 can have a first side 120 and a second side 125 which can be the "sides" of the housing that usually connect a front face and a rear face of a device housing. Nevertheless, the invention is not limited in this regard as the housing 105 can include non-rectangular shapes, such as spheres and ovals, where the first side 120 and the second side 125 can be appropriately located on the non-rectangular housing.

The first side 120 can include one or more recessed areas (or mounting structures) 130 and the second side can include one or more openings 150. The openings 150 can be used for accepting portions of the floor member 110 and the recessed areas 130 provide a location for pivotally mounting the floor member 110 to the housing 105 during assembly. The recessed areas 130 can include any indentations, angled structures, crevices, and any other suitable structure, onto which a corresponding structure can be engaged. Nevertheless, the invention is not limited in this regard as the recessed areas 130 can also include any holes, slits, and apertures into which a corresponding structure can be engaged.

Returning to FIG. 1, the floor member 110 can include any structure that partially extends across the body of the housing 105. The floor member 110 can include a recess 155 for holding an integrated circuit card and can support a battery 160. The floor member 110 can separate components of the electronic device and can also provide a support structure that enhances the overall stiffness of the housing assembly 100. The floor member 10 can include one or more protrusions 135 (see also FIG. 2) that can be pivotally mounted to the recessed areas 130. As an example, the protrusions 135 can have a corresponding structure to the recessed areas 130 so that the protrusions 135 mimic the shape of the recessed areas 130 when the floor member 110 is in the assembled position. Such an anatomically mating fit removes any "play" of the engagement and can help substantially prevent any movement of the floor member 110 in the assembled position. Nevertheless, protrusions 135 with any shape that can pivotally mount to said recessed areas 130 are suitable.

The floor member 110 can also include one or more blocking structures 140 that can be used to secure the floor member 110 in the assembled position. The blocking structures 140 can include any curved or angled structure for passively engaging another structure by at least partially enclosing around the engaged structure. As shown in FIGS. 1 and 2, the blocking structure 140 can form a hook portion with a curved surface for passively engaging corresponding shaped curved members such as the tubular member 115. Nevertheless, the invention is not limited in this regard as the blocking structures can include any appropriately shaped structures such as right-angled structures and can also include an extending portion of the floor member 110 that does not include any bends or angles.

The blocking structures 140 can also be an integrated portion of the floor member 110. As used herein, the term integrated denotes a material and/or structure that is unitary and does not include separate pieces or components that have been mechanically and/or chemically fixed together to formed an overall complete structure and/or material. An integrated blocking structure 140, particularly an integrated hook portion, can provide a stiffened housing assembly devoid of any play when compared to a housing assembly comprised of multiple components which are chemically and/or mechanically affixed to each other.

The blocking member (or tubular member) 115 can also be provided for engaging a portion of the floor member 110, such as the blocking structure 140, to prevent any movement of the floor member 110. The blocking member 115 can include any structure, such as an elongated tubular member or cylinder, suitable for engaging a portion of the floor member 110. Further, the blocking member 115 can be constructed of any material of sufficient strength, such as a plastic or metal, that can prevent movement of the floor member 110.

To provide a partially assembled housing 105 as shown in FIG. 1, the floor member 110 can be pivotally coupled to the recessed areas 130 on a first side of the housing 105. The floor member 110 can be pivoted into the assembled position such that the blocking structure 140 travels through the openings 150 in the housing 105. With the floor member 110 in such a position, the blocking member 115 can be at least partially inserted into the housing 105 so that the blocking structures 140 engage the blocking member 115. The blocking member 115 is shown as an elongated cylinder extending along the second side 125. The blocking structures 140 of the floor member 110 are shown as curved portions that partially wrap around the blocking member 115. The blocking member 115 and the blocking structure 140 form a passive blocking configuration that can prevent the floor member 110 from pivoting on the first side 120 and generally prevents any movement of the floor member 110. A passive blocking configuration is one in which the structures are prevented from moving without the use of mechanical and/or chemical attachments. Accordingly, a passive blocking configuration can include an interlocking configuration without mechanical and/or chemical attachments in which the structures interlock together to prevent movement. For instance, the blocking structures 140 can engage and interlock with the blocking member 115. An interlocked configuration can also increase the overall support provided by the floor member 110.

Also in accordance with the inventive arrangements and as shown in FIG. 2, a circuit board 170 with ground pad 175 can be provided. The different components of the housing assembly 100 can be grounded directly and/or indirectly to a circuit board 170. The circuit board 170 can be in contact with the floor member 110 which can be formed of an electrically conductive material, such as stamped sheet metal and the like. Additionally, the blocking member 115, which can include an antenna tube (or antenna housing), can also be formed of an electrically conductive material and fixed to the housing 105. Because the blocking structure 140, which is part of the electrically conductive floor member 110, is in contact with the blocking member 115, the blocking member can be indirectly grounded to ground pad 175 on the circuit board 170. As the antenna tube is typically directly grounded to a ground pad 175 on a circuit board 170 at a ground location in direct contact with the antenna, indirectly grounding the antenna tube through the floor member 110 allows the ground pad 175 of the circuit board 170 to be at any location along the circuit board 170.

Figure 3:
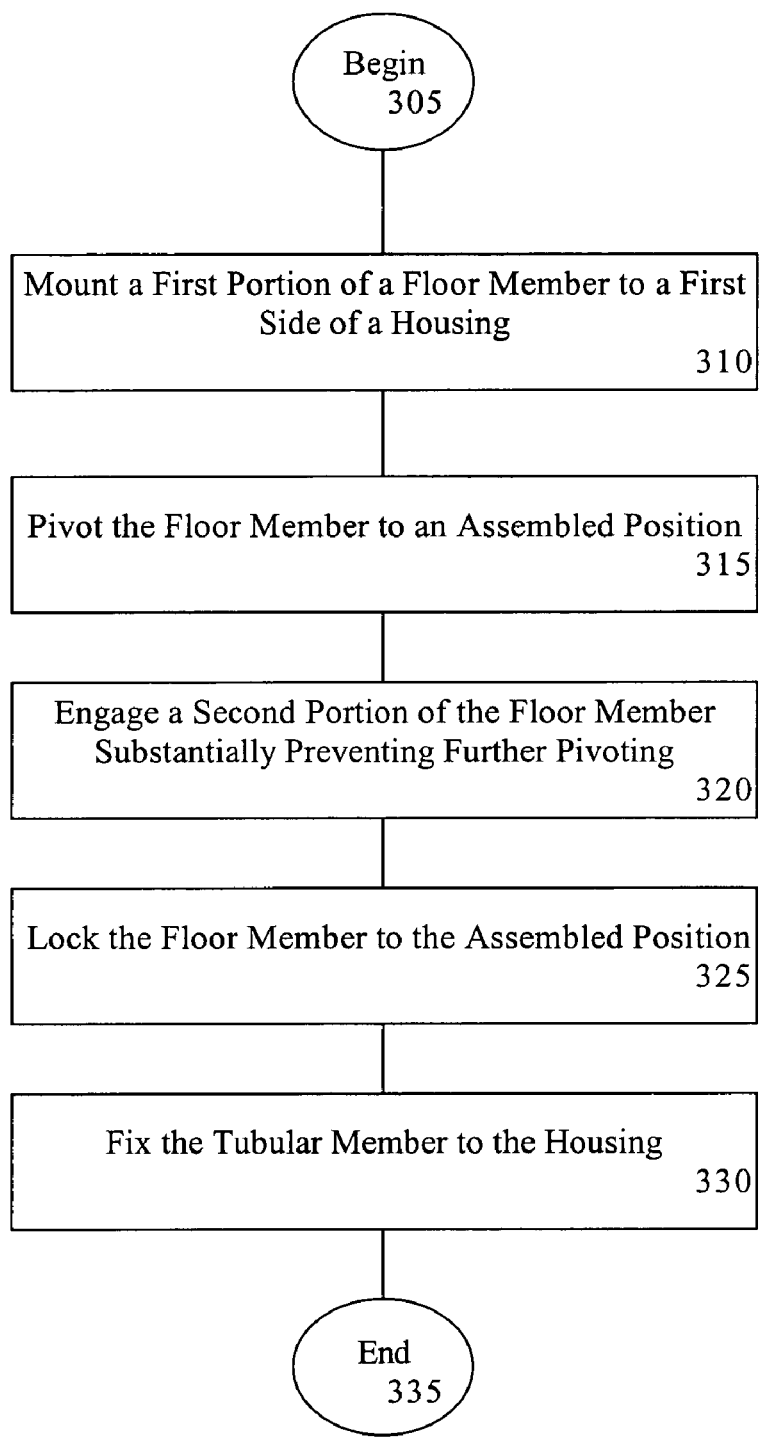
FIG. 3 depicts a flow chart for a method of assembling a housing assembly in accordance with the inventive arrangements.

Also in accordance with the inventive arrangements, a method 300 of assembling a device is provided. The steps of the method 300 are illustrated in a flow chart in FIG. 3; however, it should be noted the method can be practices by completing the steps listing in the claims in any order. Further, it should also be noted that some of the steps of method 300 can be eliminated and/or only partially completed and that additional steps can be added without departing from the invention. Method 300 can begin at step 305.

In step 310, a first portion of a floor member can be engaged with and pivotally mounted to a first side of a housing. Engaging and pivotally mounting a floor member can include simply placing a portion of the floor member in contact with the housing. Further, engaging and pivotally mounting a floor member can also include aligning portions of the floor member, such as protrusions, with corresponding portions of the housing to ensure a pivotal mount.

With the floor member pivotally mounted to the housing, the floor member can be pivoted into the assembled position in step 315. Pivoting the floor member to an assembled position includes pivoting the floor member to a position found in the final assembled handheld device, and also includes pivoting the floor member from some intermediate position in which the floor member will be further moved to the final assembled position.

In step 320, a second portion of the floor member can be engaged to substantially prevent further movement of the floor member. The second portion of the floor member can be engaged by slidably introducing a tubular member through the housing and adjacent to a blocking structure of the floor member. Thus, the tubular member slides into contact with the blocking structure of the floor member.

With the tubular member slidably introduced, the floor member can be locked into position in step 325. Slidably introducing the tubular member prevents the floor member from returning to the position from which it pivoted. Further, in conjunction with the pivotally mounted first portion of the floor member to the housing, the engaged second portion of the floor member prevents any substantial movement of the floor member.

In step 330, the tubular member can be fixed to the housing. The tubular member can be fixed to the housing with any appropriate means. For example, the tubular member and the housing can include corresponding threaded structures so that the tubular member can be rotated into a secured position. In another example, the tubular member can be fixed to the housing by ultrasonic welding. Nevertheless, it should be noted that any method or structure for fixing the tubular member to the housing can be used. The method can end at step 335.

Thus, the invention can solve the problem of designing and assembling a housing with a floor member where the floor member is secured without any mechanical and/or chemical attachments. Further, such a design using electrically conductive materials enables the circuit board ground pad to be placed at any location along the circuit board. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

Although the Figures depict a mobile phone housing assembly, one skilled in the art will appreciate that the invention includes other devices, such as cordless phones, two way radios, pagers, personal digital assistants, laptop computers, and the like. Additionally, the description above is intended by way of example only and is not intended to limit the present invention in any way, except as set forth in the following claims.

What is claimed is:

1. A housing assembly, comprising: a housing having at least one recessed area on at least a first side; a floor member having at least one protrusion and pivotally mounted to the at least one recessed area on the first side using the at least one protrusion; and a tubular member for engaging the floor member on a second side of the housing, wherein the engagement prevents the floor member from pivoting, wherein the floor member further comprises at least one hook portion that is dimensioned to at least partially wrap around the tubular member, wherein the tubular member is an antenna tube fixed to the housing.

2. The housing assembly of claim 1, wherein the hook portion extends through an opening in a portion of the housing to engage the tubular member.

3. The housing assembly of claim 1, wherein the floor member is made from an electrically conductive material.

4. The housing assembly of claim 1, wherein the housing assembly is for a portable electronic product.

5. The housing assembly according to claim 1, wherein said housing assembly includes a circuit board and said tubular member is indirectly grounded to the circuit board through the floor member.

6. A handheld device, comprising: a housing, at least one mounting structure on said housing; at least one plate member, said plate member pivotally mounted to said mounting structure and having at least one blocking structure; at least one blocking member, wherein said blocking member and said blocking structure form a passive blocking configuration, said blocking member blocking said plate member from pivoting, wherein said blocking structure includes at least one hook portion dimensioned to at least partially wrap around said blocking member, wherein said blocking member is an antenna housing.

7. The device according to claim 6, wherein said blocking member is an elongated cylinder.

8. The device according to claim 6, wherein said plate member includes a recess for holding an integrated circuit card.

9. The device according to claim 6, wherein said handheld device includes a circuit board, said blocking member is indirectly grounded to said circuit board through said plate member.

10. The device according to claim 6, wherein said plate member supports a power supply.

11. The device according to claim 6, wherein said plate member includes at least one protrusion and said mounting structure includes at least one recessed area corresponding to said protrusion.

12. A method of assembling a handheld device, comprising the steps of: engaging and pivotably mounting a first portion of a floor member to a first side of a housing; pivoting the floor member to an assembled position; engaging a second portion of the floor member by slidably introducing a tubular member through the housing and adjacent to a blocking structure of the floor member such that the blocking structure at least partially wraps around the tubular member, thereby substantially preventing further pivoting of the floor member, wherein said tubular member is an antenna tube.

13. The method of claim 12, wherein the step of engaging locks the floor member to the assembled position.

14. The method of claim 12, wherein the method further comprises the step of fixing the tubular member to the housing.

* * * * *